Jan. 15, 1929.

A. R. GOLDRICK 1,699,236

LIQUID DISPENSING VALVE

Filed May 29, 1922 2 Sheets-Sheet 1

INVENTOR.
Albert R. Goldrick,
BY
Batey & Macklin,
ATTORNEYS.

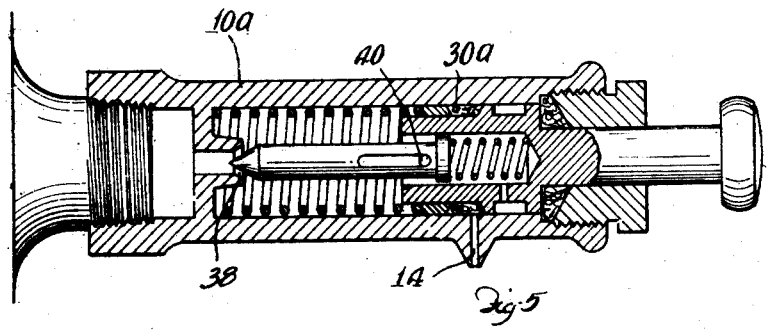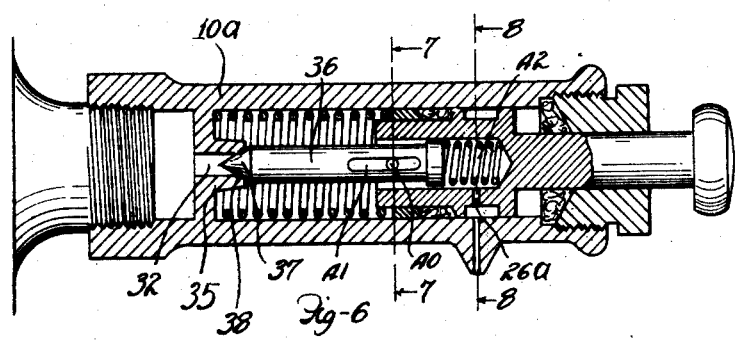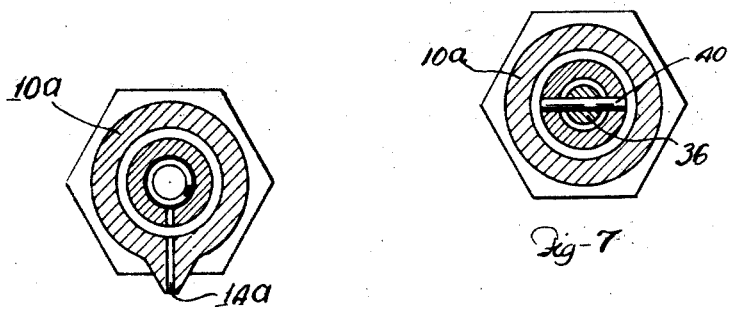

Patented Jan. 15, 1929.

1,699,236

UNITED STATES PATENT OFFICE.

ALBERT R. GOLDRICK, OF CLEVELAND, OHIO, ASSIGNOR TO THE GERSON STEWART CORPORATION, COMPANY, OF CLEVELAND, OHIO, A CORPORATION OF OHIO.

LIQUID-DISPENSING VALVE.

Application filed May 29, 1922. Serial No. 564,368.

This invention is directed to improvements in liquid dispensing devices and is more particularly concerned with dispensing valves such as are used for dispensing liquid soap from a pipe line connected with a remotely positioned supply reservoir.

The general object of the present invention is the provision of a valve wherein a slidable valve stem or piston is arranged to carry expansible packing means, and resilient means for maintaining the piston in a normally outward position as well as maintaining the packing means in an expanded or compressed relation to the cylindrical wall of the valve body, whereby an outlet port of the valve may be closed by the expansible packing means when the valve is not in use.

A more specific object of the present invention is the provision of a dispensing valve having a piston slidably mounted within a cylindrically bored discharge chamber formed in the valve body and packing means movable with the piston and arranged to normally seal the valve outlet or dispensing port and to also close an inlet port during a preliminary movement of the piston during which period the outlet port is maintained closed thereby. The arrangement of the packing upon the piston being such that the liquid may escape from the discharge chamber to the outlet port of the valve, through a suitable passageway formed in the piston and about which the packing means extends.

Other objects will be hereinafter set forth in connection with the following description which refers to the accompanying drawings. The essential objects will be summarized in the claims.

Figure 1:
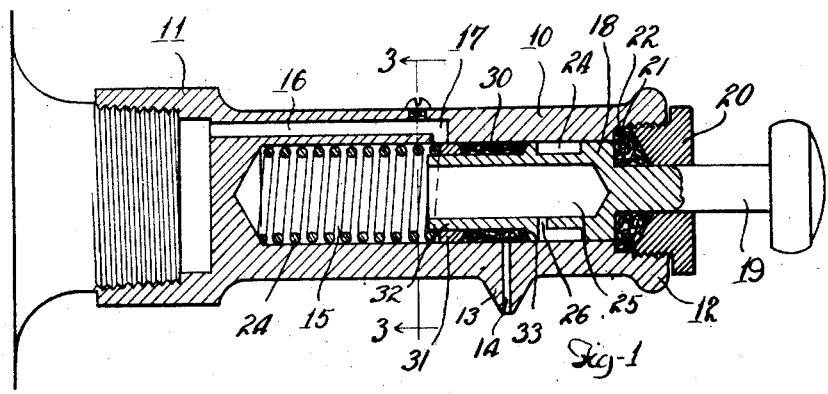
Figure 2:
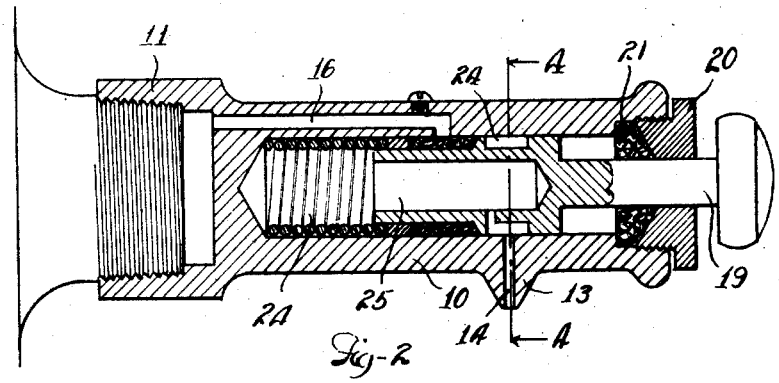
Figure 3:
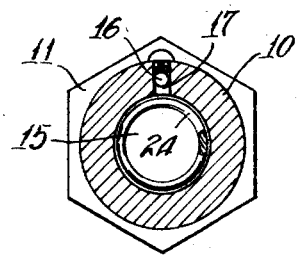
Figure 4:
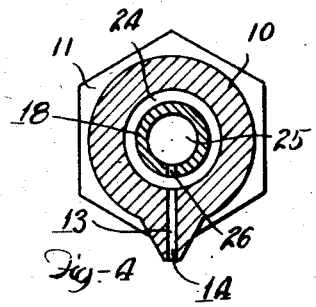

In the drawings, Fig. 1 is a cross sectional view taken centrally of a valve embodying my invention, showing the piston in a normally outward position; Fig. 2 is a similar cross sectional view showing the piston in an inward or discharging position; Fig. 3 is a section taken substantially along the line 3—3 of Fig. 1; Fig. 4 is a section taken along the line 4—4 of Fig. 2; Fig. 5 is a cross sectional view of a valve similar to the valve shown in Fig. 1 showing however a modified form of valve construction; Fig. 6 shows the relation of the valve members in this modified construction when the valve is dispensing liquid; Fig. 7 is a section taken on the line 7—7 of Fig. 6; Fig. 8 is a cross sectional view taken on the line 8—8 of Fig. 6.

Referring to the drawings by the use of reference characters, in Fig. 1, I have shown a cylindrical valve body 10 provided with a hexagonal end portion 11 suitably bored and interiorly threaded to adapt the valve to standard pipe fittings. The valve body is provided with an annular shoulder 12 at its outer end to improve the appearance thereof, while intermediate the ends of the valve is a projecting portion 13 formed in the nature of a dispensing spout and provided with a passageway 14 communicating with the discharge chamber 15 of the valve. An inlet passageway 16 is formed in the valve body, eccentrically of the bore 15 which constitutes the discharge chamber of the valve body, while a short radial passageway 17 affords communication between this passageway and the discharge chamber.

A hollow piston 18 is slidably mounted in the discharge chamber and is provided with a reduced stem portion 19 bearing in a packing or jamb nut 20 which is in threaded engagement with the outer end of the valve body. Suitable packing 21 is disposed between the inner end of the packing nut and a shoulder 22 formed on the valve body; the packing having a considerable portion of the inner face thereof exposed to afford an abutment for the outer end of the piston. The piston is normally maintained in compressed relation with the packing by a spring member 24 acting on the piston and other packing carried thereby as will be presently described. The pressure of the spring member upon the piston, causes the outer end thereof to firmly press against the packing and prevent leakage along the stem 19 when the valve is not in use.

The piston is provided with an annular recess or depression as shown at 24 which is formed on the piston at a proper distance from the inner end thereof to span the discharge outlet 14 after a preliminary inward movement of the piston has taken place. Communication is afforded between this annular recess and the discharge chamber through a suitably bored passageway 25 and an opening 26 between the bore 25 and the recess 24.

To effectively seal the dispensing port 14, I have provided an annular packing ring or sleeve 30 upon the piston which is maintained in slidable but compressed relation with the wall of the valve body by a ring 31 also mounted on the piston. As shown in Figs. 1 and 2, the spring 24 is arranged to act upon one end of the ring and thus forces it against the end of the packing sleeve. The ring may have a tapered end 32 in abutting relation to the packing sleeve to increase the tendency of the packing sleeve to expand. The piston likewise may have a tapered shoulder 33 in abutting relation with the other end of the packing sleeve. The action of the spring 24 therefore, upon the sleeve, indirectly causes an expansion of the packing sleeve and when the packing wears, due to constant use, this wedging action will cause the packing to expand sufficiently to compensate for the wear.

The length of the piston, as well as the length of the packing sleeve mounted thereon, is such that communication from the passageway 16 to the discharge chamber 17 will be closed by reason of the sleeve being advanced into the discharge chamber during a preliminary movement of the piston in which period the outer portion of the packing sleeve will maintain the dispensing opening 14 closed. In other words, the length of the packing sleeve is slightly greater than the distance between the inlet pasageway 17 and the discharge passageway 14. Hence, upon a further inward movement of the piston, the packing sleeve will continue to maintain the inlet port 17 closed, but the discharge port 14 will be in communication with the space 24 provided by the recessing of the piston as hereinbefore referred to. This condition is illustrated by the position of the piston in Fig. 2.

It will be noted that the packing carried by the piston serves the double purpose of sealing the outlet or dispensing opening of the valve when the valve is not in use and when in use this packing sleeve serves to close communication between the supply line and the valve precedent to the opening of the dispensing port of the valve, thus preventing the establishing of a continuous flow of liquid from the supply line through the valve. Furthermore, the spring serves the double purpose of operating the piston in one direction when the valve is in use, as well as to act upon the packing to cause the same to expand and compensate for the wear which takes place from constant usage. It is to be noted that the liquid does not pass the packing when being discharged but escapes through suitable passageways formed in the piston and about which the packing is arranged.

In the modified form of valve construction which I have illustrated in Figs. 5 to 8, the inlet port of the discharge chamber may be formed in the end wall 35 of the valve body 10$^a$ in alignment with the center line of the piston. In this construction, I provide a plunger 36 having a coniform or needle end 37 which is arranged to contact with a valve seat 38 formed concentrically of the inlet port 39. The plunger member is mounted in the bore of the piston and is retained in cooperative relation therewith by a pin member 40 which passes through the inner end of the piston and engages the plunger in an elongated slot 41. In this case, a second spring member 42 is provided to maintain the plunger in an extended relation to the piston and to permit a continued movement of the piston after the plunger movement is interrupted due to the seating of the valve end thereof on the valve seat formed in the end wall of the valve body. As shown in Figs. 5 and 6, the spring member referred to, is disposed in the piston bore and abuts the bottom thereof and the inner end of the plunger.

The dispensing port 14 is closed in the manner hereinbefore described by the packing sleeve 30$^a$ and the liquid is discharged from the valve in the same manner as in the valve shown in Figs. 1 to 4 as the construction of the piston is substantially the same as the piston construction illustrated in Figs. 1 and 2. The packing sleeve 30$^a$ in this case, serves only to seal the discharge outlet 14$^a$ during the preliminary inward movement of the piston when the plunger is being advanced thereby to its seating or closing position as illustrated in Fig. 6. The relation of the diameter of the plunger bore to the bore of the piston is such, that the liquid may pass along the plunger through the bore of the piston and be discharged through the passageway 26$^a$ whence it is dispensed through the discharge port 14$^a$.

From the foregoing description, it will be noted that I have provided a dispensing valve of the piston type having a novel piston construction arranged to carry packing means which maintains a seal between the piston and the wall of the valve body; the packing serving to alternately close and open the inlet and outlet ports formed in the valve body. The method of positioning the packing upon the piston has the exceptional advantage of compensating for the unavoidable wear of the packing through the influence of a spring member which is common to all valves of this type, and which serves the double purpose of returning the piston to its normally outward position as well as to act upon the packing in such a manner as to cause the expansion thereof. Furthermore, the construction is such, that the production of the valve parts involves only simple manufacturing processes. Likewise, the piston construction is such, that positive means for closing the inlet port of the valve against considerable head pressure in the supply line will also be effective in closing this inlet port prior to the opening of the discharge port, thus preventing the positioning of the piston by the user to obtain a constant flow of liquid from the supply line through the valve.

I claim:

1. In a dispensing valve, the combination of a valve body having an inlet formed in an end wall of the valve body and an outlet port, a discharge piston slidably mounted in the valve body, a packing sleeve mounted on the piston and adapted to normally seal said discharge port, and resilient means normally maintaining the piston in an outward or non-discharging position and reacting on said packing sleeve and expanding it radially to maintain it in sealed relation with the discharge port.

2. In a dispensing valve, the combination of a valve body having an inlet and an outlet port, a discharge piston slidably mounted in the valve body, packing means mounted on the piston and adapted to normally seal said discharge port, said piston having a passageway extending from the inner end thereof affording communication from one end of the packing means to the other, and resilient means acting on the packing to expand it and to normally maintain the piston in an outward or non-discharging position with said packing means in sealed relation with the discharge port.

3. In a dispensing valve, the combination of a valve body having a discharge chamber provided with an inlet and a passageway for dispensing the liquid, a piston mounted therein, means including a radially expansible gasket mounted on the piston, a slidable follower for the gasket and a spring continuously forcing the follower for preventing leakage from the discharge chamber to said passageway, said gasket being so positioned on the piston as to seal said passageway when the valve is normally inoperative, said piston also having a passageway affording communication from the discharge chamber of the valve to said dispensing passageway when the piston is moved inwardly.

4. In a dispensing valve, the combination of a valve body having a discharge chamber provided with an inlet and an outlet port, a piston slidably mounted within the discharge chamber, said piston having a portion of less diameter than the diameter of the discharge chamber and having a passageway extending through an end thereof and outwardly to establish communication with a discharge passageway formed in the valve body, a packing ring positioned on said reduced portion of the piston, a metallic ring slidably positioned on said reduced piston portion in contact with the packing and a spring disposed within the discharge chamber with one end abutting an end wall of the discharge chamber and the other end engaging said slidable metallic ring whereby the packing may be maintained in an expanded condition due to the reaction of the spring thereupon.

5. In a dispensing valve for liquid soap, the combination of a valve body having a displacement chamber provided with an inlet port, a recessed piston in said chamber, an outlet port formed in the body normally closed by said piston, a stem having a pin and slot connection with the piston supported at one end in the recess thereof and arranged to close the inlet port, resilient means in the displacement chamber for normally holding the piston in outlet port closing position and for normally holding the stem out of closing position with reference to the inlet port, and other resilient means in the piston recess arranged to cause the stem to close the inlet port when the piston is moved against the action of the first named resilient means.

In testimony whereof, I hereunto affix my signature.

ALBERT R. GOLDRICK.